United States Patent [19]

Behr et al.

[11] Patent Number: 4,473,612
[45] Date of Patent: Sep. 25, 1984

[54] FLASHED GLASS

[75] Inventors: Werner Behr, Alfeld; Georg Gliemeroth, Mainz; Klaus-Peter Hanke, Delligsen, all of Fed. Rep. of Germany

[73] Assignee: Deutsche Spezialglas AG, Fed. Rep. of Germany

[21] Appl. No.: 297,335

[22] Filed: Aug. 28, 1981

[30] Foreign Application Priority Data

Sep. 11, 1981 [DE] Fed. Rep. of Germany ....... 3032580

[51] Int. Cl.$^3$ .......... B32B 7/02; B32B 33/00; B32B 17/06; C03B 17/00
[52] U.S. Cl. .................. 428/213; 428/428; 428/913; 65/90; 65/60.1
[58] Field of Search .............. 428/212, 428, 913, 213

[56] References Cited

U.S. PATENT DOCUMENTS

| 3,419,370 | 12/1968 | Gramer et al. | 428/428 |
| 4,035,527 | 7/1977 | Deeg | 427/169 |
| 4,204,027 | 5/1980 | Simon | 428/428 |
| 4,240,836 | 12/1980 | Borrelli et al. | 428/428 |

Primary Examiner—P. Ives
Attorney, Agent, or Firm—Hill, Van Santen, Steadman & Simpson

[57] ABSTRACT

A phototropic multilayered glass sheet incorporating at least two interfacially laminated layers, one layer consisting of a nonphototropic carrier glass, and at least one other layer consisting of a phototropic glass. In manufacture, at least one of the glass streams is characterized by having a viscosity of less than $10^{7.6}$ d PAS at the location where the streams are brought together.

10 Claims, 2 Drawing Figures

FLASHED GLASS

BACKGROUND OF THE INVENTION

1. Field of the Invention

The invention relates to a flashed glass consisting of at least two glass layers of different composition, as well as to a method for the manufacture of such a flashed glass.

2. State of the Art

Flashed glasses, for example, the known flashed milk glass, have been industrially manufactured for decades, namely in such a manner that a thin surface layer of cloudy glass is applied to a glass ribbon which is still soft and has just been manufactured in a Fourcault method or in a modified technology, whereupon the two glass layers are allowed to harden into sheet glass in common in a cooling stack.

Phototropic sheet glasses as are described in the German LP No. 21 25 232, whereby please see the German LP No. 15 96 847 as well as the German LP NO. 24 04 752, for example for the composition of phototropic glasses, are suitable for numerous use purposes. For example, there is a considerable need for economical phototropic vitrification elements which are technologically unproblematical to manufacture and are suitable for automobile glazing, skyscraper glazing, for device windows in structures of various types, but are also suitable for opthalmic, cosmetic and medical purposes as well as for various architectural use purposes. It is thereby desirable to be able to vary the phototropy in the greatest possible ranges, without having to influence significant parts of the manufacturing process.

Given previously known phototropic glasses, it has proven difficult to achieve these goals. In particular, the known phototropic glasses are too costly for numerous use purposes due to the relatively high silver concentration in relationship to the glass cross-section. Thereby, the problem lies therein that phototropic sheet glasses, particularly sheet glasses containing silver halogens, require the presence of silver everywhere in the glass over the entire glass cross-section in order to achieve homogenous phototropic properties, although the penetration depth of the excitation radiation usually does not suffice in order to use all of the silver. A further problem lies therein that the standard sheet glass technologies exhibit large glass surfaces of the smelting container, so that easily volatized components such as the silver and the halogens exhibit high evaporation rates. Special smelt container designs, however, are costly and are hitherto hardly in a position to supply phototropic glass panes with sufficient dimensions as are desirec, for example for architectural applications. A further problem lies therein that phototropic glasses usually $B_2O_3$ and that, in general, glasses with $B_2O_3$ contents of more than 5 weight percent can be manufactured in sheet glass smelting systems and drawing systems only with relative difficulty.

BRIEF SUMMARY OF THE INVENTION

The object of the invention is to create a phototropic sheet glass which avoids the disadvantages described above and in which the phototropy can be varied within wide limits upon simultaneous reduction of the silver concentration as it relates to the overall glass cross-section, in order to thus achieve a reduction of costs. Further, a method for manufacturing such a glass is to be created.

This object is inventively achieved by means of a flashed glass of the species type which is characterized in that at least one of the glass layers consists of a non-phototropic carrier glass and at least one other glass layer consists of a phototropic milk.

The inventive method for manufacturing such a flashed glass in which at least one carrier glass stream and at least one milk stream are brought together, is characterized in that at least one of the glass streams exhibits a viscosity of less than $10^{7.6}$ dPas at the location where it is brought together with the other glass stream, or, respectively, the other glass streams.

DETAILED DESCRIPTION

What is meant here, as in the following, by a flashed glass is a material which is manufactured by means of having two different glass streams flow together, whereby at least one glass stream is situated in a viscosity range between $10^1$ and $10^{7.6}$ dPas. What is thereby important in general is that all glasses employed for the manufacture of this flashed glass, i.e., at least two glasses, are matched to one another in terms of their thermal and physical properties in such a manner that a tension-free product arises.

One of the two types of glass employed in the inventive flashed glass, namely the milk, is composed in such manner that phototropy can be generated in it by means of suitable measures at the command of one skilled in the art. It has been demonstrated that the viscosity conditions, particularly in that area in which the glass streams come into contact with one another, play a decisive role for the interactions between the geometry of the arising flashed glass on the one hand, and the phototropy which can be generated on the other hand, so that particular significance must be accorded to the viscosity limit claimed in the inventive method. Further, the invention is based on the perception that glass compositions previously known for phototropic glasses are not particularly suitable for the solution of the inventive object. Thus, the employment of a carrier glass on the base of a boron silicate composition is not suited for the manufacture of large-surface panes according to traditional methods because of the ease of evaporation of the $B_2O_3$. For this reason, the claimed composition for the carrier glass on the one hand, as well as for the milk on the other hand are suited for the solution of the erected object in a particularly advantageous manner.

In the composition of the milk, it is not only the viscosity limitation described above, as well as the fusion properties with the carrier glass which are of significance, but rather, of course, it is also necessary to generate sufficiently strong phototropy in a thin glass layer. For reasons of shaping technology, namely, it is advantageous when the carrier glass exhibits approximately 3 times the thickness of the milk, referring to the finished pane. On the other hand, the thickness of the overall flashed glass cannot be enlarged at random so that, on the one hand, the demand results of having the concentration of the phototropy in the milk be at least as strong as in a solid, homogenous phototropic sheet glass, whereby, on the other hand, however, it must taken into consideration that the goal of relatively low material costs can only be achieved when the concentration of the components generating the phototropy need not be selected all too great. Surprisingly, it has been shown that it is possible to add less than the thickness-proportional concentration of the phototropy generating components to the mixture of the milk, and nonetheless, obtaining an at least equivalent thickness-proportional phototropy in the flashed glass by means of a suitable selection of the composition of the milk.

One advantageously succeeds in this by means of the inventively claimed compositions, whereby all percentages are synthesis weight percents.

Of course, other additives than those of silver, halogens and copper are possible in the inventive flashed glass as the components generating the phototropy, but however, additives of silver oxide, copper oxide and the halogens Cl, Br, I have proven particularly advantageous.

The inventive flashed glass is not produced in a special smelting technology but, fundamentally, known methods are inventively combined in such a manner that, in particular, the problem of the penetration depth of the excitation radiation and the problem of the homogenous, unnecessarily high silver concentration of known phototropic glasses are eliminated. Further, large-surface, phototropic sheet glasses can be manufactured in a simple manner by means of the inventive method. All of these advantages are achieved by means of a suitable selection of the composition as well as by means of the inventively provided combination of the carrier glass and the milk. What is technologically particularly favorable is an approximate coincidence of the linear coefficients of expansion as well as a corresponding viscosity behaviour below the transformation temperature of both types of glass, namely of such manner that, after the rapid cooling of the flashed glass, a slight tensile stress of approximately 25 through 65 nm/cm prevails in the carrier glass and a slight compressive stress of approximately 25 through 65 nm/cm prevails in the milk.

DESCRIPTION OF THE DRAWINGS

Further features and advantages of the invention derive from the following description on the basis of the drawing.

Thereby, there are shown.

Figure 1:
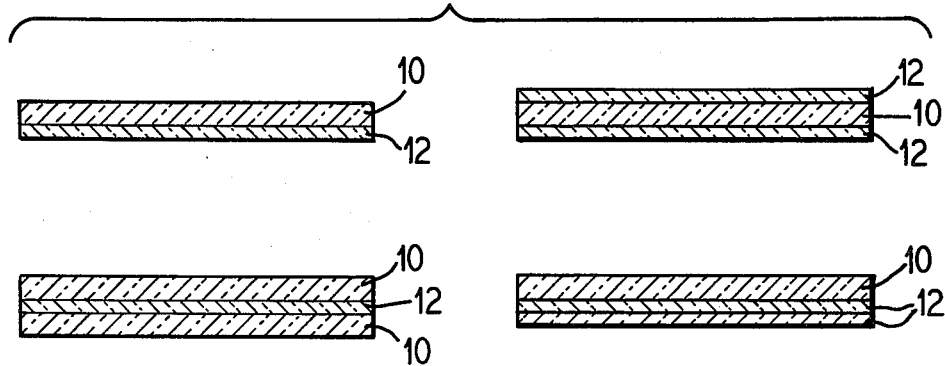
FIG. 1 four different sample embodiments of a flashed glass according to the invention in a section perpendicular to the plane of the sheet glass.

At the top left in FIG. 1, an inventive flashed glass is shown which consists of a carrier glass layer 10 and of a milk layer 12. In the case of the sample embodiment shown in FIG. 1 at the top right, the carrier glass 10 is covered with a milk layer 12 at both sides. In contrast thereto, the milk 12 in the sample embodiment shown in FIG. 1 at the bottom left is covered at both sides by carrier glass 10, whereas, finally, two successive milk layers 12 are disposed on the carrier glass 10 in the sample embodiment shown in FIG. 1 at the bottom right.

Figure 2:
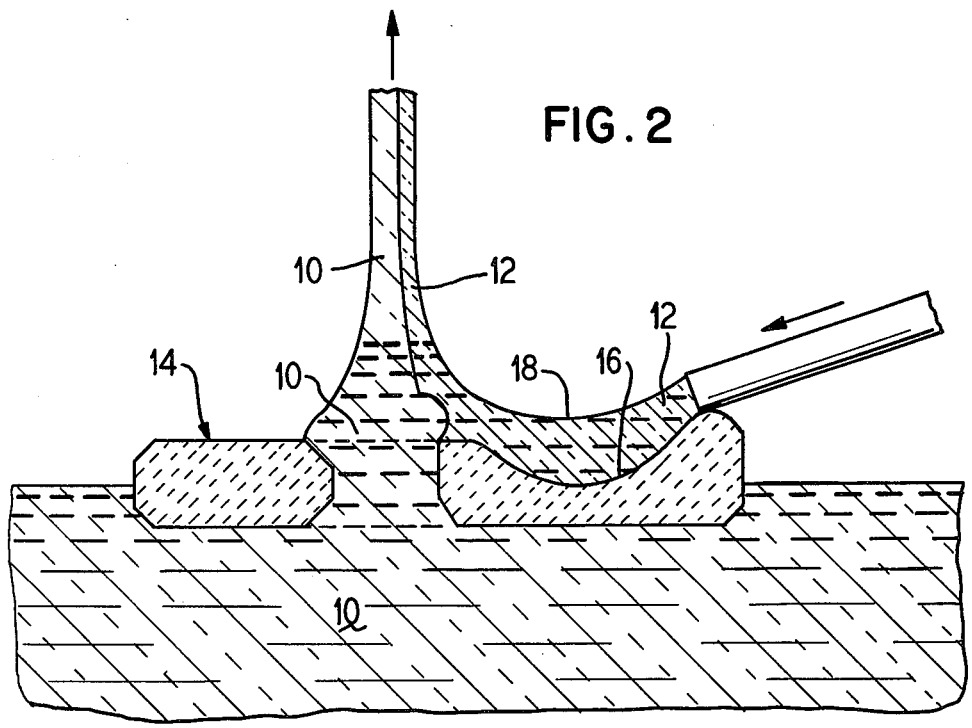
FIG. 2 a sample embodiment of a Fourcault nozzle arrangement for the manufacture of the inventive flashed glass in a section perpendicular to the plane of the sheet glass.

As FIG. 2 shows, the inventive flashed glass can be manufactured by means of a traditional sheet glass melting end which is batched with an inventive composition of the carrier glass 10. After melting, purification and homogenization, the carrier glass 10 arrives in the refiner in which a ceramic nozzle 14 floats. The carrier glass is withdrawn toward the top through this nozzle in a broad ribbon.

The nozzle 14 exhibits a cavity 16 whose surface 18 lies higher than that of the carrier glass 10. When the low viscosity milk 12 is introduced into the cavity 18, then this flows over the edge of the cavity in the direction of the carrier glass ribbon 10 drawn perpendicularly toward the top, moistens the ribbon of the carrier glass 10 and is withdrawn toward the top in a thin layer. The thickness of the two glass ribbons is determined by the relative viscosity of both glasses or, respectively, by the temperatures prevailing in the different areas. The relationship of the viscosities, as a function of the geometrical requirements, the possibilities of producing phototropic glass under these conditions and the matching of the two glasses with respect to one another determine the possibility of the manufacture and the quality of the product.

EMBODIMENTS

In the following, the invention is illustrated on the basis of examples.

EXAMPLE 1

A carrier glass was melted in a sheet glass trough with a glass content of 50 tons with a Fourcault traction, the mixture of said carrier glass having been weighed in as follows:

70.3 kg Sand
0.86 kg Aluminum Oxide
12.6 kg Calcium Carbonate
1.95 kg Barium carbonate
1.04 kg barium nitrate
2.81 kg zinc oxide
0.56 kg titanium oxide
18.96 kg soda
7.27 kg Potash
0.77 kg Antimony oxide
0.25 kg Arsenic oxide After mixing, the glass mixture was melted at 1415° C., was purified at 1450° C. and was then drawn vertically toward the top as carrier glass 10 through the modified Fourcault nozzle shown in FIG. 2. At the same time, a milk consisting of the following mixture was melted in a conventional, electrically heated shaft furnace:

38.0 kg Sand
29.3 kg Boric acid oxide
7.60 kg Aluminum hydroxide
1.48 kg Zirconium silicate
23.80 kg Plumbous-Plumbic oxide
4.99 kg Lithium carbonate
6.45 kg soda
2.45 kg sodium chloride
1.93 kg sodium bromide
11.93 kg potash
0.03 kg copper oxide
0.74 kg silver nitrate.

After mixing, this glass mixture was melted at 1250° C., was purified at 1320° C., and was conducted as milk 12 into the modified Fourcault nozzle according to FIG. 2. Thereby, a flashed glass arose given contact temperature of both glasses of approximately 900° C., which exhibited a carrier glass thickness of 1.6 mm as well as a milk thickness of 0.4 mm. The tempering of the flashed glass manufactured in this manner at 620° C., with two hours tempering time, produced phototropy with 92% output transmission, 36% saturation transmission (after 15 minutes exposure with Xenon light on the milk side), whereby the regenerative half-life value amounted to 3.2 minutes.

EXAMPLE 2

A carrier glass 10 with the following composition was melted:
$SiO_2$ —70.1 weight %
$Al_2O_3$—0.8 weight %
CaO—6.9 weight %
BaO—2.1 weight %
$TiO_2$—0.6 weight %
$Na_2O$—11.1 weight %
$K_2O$—5.0 weight %
$Sb_2O_3$—0.5 weight %

This carrier glass, with a linear coefficient of thermal expansion between 20° and 300° C. of $95 \times 10^{-7}/°C.$, is well suited for melting in glass troughs with large, open glass surfaces, is crystallization stable, does not tend toward cloudiness and is compatible with the milk yet to be described. The composition allows a rather high ultraviolet transmission.

The carrier glass described above was drawn at 900° C. from the nozzle 14 of the device schematically illustrated in FIG. 2, corresponding to $10^{4.9}$ dPas. The softening temperature with a carrier glass composition lies at 705° C. ($=10^{7.6}$ dPas), the processing temperature lies at 1008° C., the transformation temperature lies at 523° C. Thus, the overall viscosity behaviour can be calculated according to VFT.

The milk 12 below was combined with this carrier glass to form inventive phototropic flashed glass:

| | |
|---|---|
| $SiO_2$ | 38.5 Weight % |
| $B_2O_3$ | 16.6 weight % |
| $Al_2O_3$ | 4.9 weight % |
| $ZrO_2$ | 1.0 weight % |
| PbO | 23.3 weight % |
| $Li_2O$ | 2.0 weight % |
| $Na_2O$ | 5.6 weight % |
| $K_2O$ | 8.1 weight % |
| | 100.0 weight % |
| $Ag_2O$ | 0.4 weight % |
| Cl | 1.5 weight % |
| Br | 1.5 weight % |

The milk with this composition, having a linear coefficient of thermal expansion between 20° and 300° C. of $95.3 \times 10^{-7}/°C.$ was melted in a small electric trough with a cold upper chamber and without a significant evaporation of silver/halogen. According to VFT the viscosity behaviour derives from the following specifications:
softening temperature—582° C.
processing temperature—825° C.
transformation temperature—444° C.

The milk flowed into the cavity 18 of the device shown in FIG. 2 at 1000° C., was very easily distributed over the entire width of the glass of the carrier glass and, in contact therewith, cooled very quickly to 900° C. A thin layer of the milk, whose thickness depends on the viscosity behaviour, was withdrawn toward the top together with the carrier glass. The milk layer on the carrier glass was uniform over the entire width of the carrier glass ribbon and depended on the composition.

EXAMPLE 3

The process according to the Example 2 was followed, however a carrier glass with the following composition was employed:

$SiO_2$—69.6 weight %
$Al_2O_3$——weight %
CaO—6.6 weight %
BaO—2.1 weight %
$TiO_2$—0.4 weight %
$Na_2O$—8.1 weight %
$K_2O$—8.5 weight %
$Sb_2O_3$—0.7 weight %
The milk employed had the following composition:

| | |
|---|---|
| $SiO_2$ | 45.4 weight % |
| $B_2O_3$ | 11.7 weight % |
| $Al_2O_3$ | 5.1 weight % |
| $ZrO_2$ | 1.0 weight % |
| PbO | 20.6 weight % |
| $Li_2O$ | 2.1 weight % |
| $Na_2O$ | 5.8 weight % |
| $K_2O$ | 8.3 weight % |
| | 100.0 weight % |
| $Ag_2O$ | 0.34 weight % |
| Cl | 1.0 weight % |
| Br | 1.2 weight % |

The advantages correspond to those achieved in the case of Example 2.

EXAMPLE 4

The procedure as in Example 3 was followed given the following compositions for the carrier glass.
$SiO_2$—70.6 weight %
$Al_2O_3$—1.4 weight %
CaO—6.8 weight %
BaO——weight %
$TiO_2$——weight %
$Na_2O$ —15.4 weight %
$K_2O$—0.8 weight %
$Sb_2O_3$——weight %
MgO—4.7 weight %
$SO_3$ —0.25 weight %
The milk employed has the following composition:

| | |
|---|---|
| $SiO_2$ | 40.0 weight % |
| $B_2O_3$ | 16.6 weight % |
| $Al_2O_3$ | 5.0 weight % |
| $ZrO_2$ | 1.0 weight % |
| PbO | 21.7 weight % |
| $Li_2O$ | 2.0 weight % |
| $Na_2O$ | 5.6 weight % |
| $K_2O$ | 8.1 weight % |
| | 100.0 weight % |
| $Ag_2O$ | 0.26 weight % |
| Cl | 0.8 weight % |
| Br | 0.7 weight % |

The advantages specified above under Example 4 were achieved.

Depending upon the melting conditions, of course, expansion corrections (changes of fusion tension) are necessary given the inventive flashed glass manufactured. The general goal is to have slight compressive tension (plus 40 nm/cm) in the milk in the flashed glass. Thereby, the most favorable correction possibility consists in a reduction or increase of the lead oxide content, but corrections carried out on other components are also possible. The exchange partner, for example, is $SiO_2$.

The composition iof the milk has a very significant effect on the advantages which can be inventively achieved. Due to its intermediary basic glass composition, the silver concentration of the milk mixture, namely, is not significantly higher than the silver synthesis of known, homogenous phototropic sheet glasses. Nonetheless, with this milk or, respectively, with the corresponding silver concentration in this milk, one achieves phototropies, i.e. saturation transmissions and regeneration properties, in the phototropic flashed glass as are achieved by phototropic, homogenous sheet glass (under standard measuring conditions 20° C., 545 nm/test wave length excitation Xenon light 20.000 1×). Even extreme phototropic properties, such as saturation transmissions below 10% can be achieved. The reason for the low consumption of silver is probably to be sought in the low evaporation, the high solubility of the silver in the milk, the advantageous dissociation behavior of the milk and the particularly high tendancy of the milk to phototropy. What is particularly favorable given the described examples is the clearly lower viscosity of the milk, so that the flashing process can be carried out in a particularly favorable manner. Of course, the carrier glass composition, the milk composition or even both can be altered within wide limits within the inventive idea, whereby corresponding changes of property are effected.

The features of the invention disclosed in the above specification, in the claims and in the drawings can be significant, both individually as well in random combinations, for the realization of the invention in its various embodiments.

We claim:

1. A phototropic glass sheet comprising at least two interfacially laminated layers of different respective compositions,
    one of said layers having opposed, generally parallel faces and consisting of a carrier glass with the following composition on a 100 weight percent total basis:
    Silicon oxide—60 through 70.6 weight %
    Alkaline earth metal oxide—4 through 13 weight %
    Alkali metal oxide—5 through 13 weight %
    Zr, Al, and Ti oxide—0 through 5 weight %
    Pb and Zn oxide—0 through 5 weight %
    Other oxides—0 through 10 weight %
    Purification oxides—0 through 1.5 weight %
    the other of said layers likewise having opposed generally parallel faces and consisting of a phototropic glass with the following composition on a 100 weight percent total basis:
    Silicon oxide—21 through 49 weight %
    Boron oxide—10 through 37 weight %
    Al, Zr, and Ti oxide—2 through 8 weight %
    Alkaline earth metal oxide—0 through 18 weight %
    Alkali metal oxide—4 through 23 weight %
    Pb and Zn oxide—1 through 36 weight %
    Other oxides including silver oxide and copper oxide—0.111 through 10 weight %
    Purifying oxides—0 through 1.5 weight %

2. The phototropic glass sheet of claim 1 wherein each face of said other layer is laminated to one face of a different respective said one layer.

3. The phototropic glass sheet of claim 1 wherein one face of said other layer is laminated to one face of said one layer and the opposing face of said other layer is laminated to one face of another said other layer.

4. The phototropic glass sheet of claim 1 wherein each said one layer has approximately three times the thickness of each said other layer.

5. The phototropic glass sheet of claim 1 wherein each said one layer has the following composition on a 100 weight percent total basis:
    $SiO_2$—70.1 weight %
    $Al_2O_3$—0.8 weight %
    CaO—6.9 weight %
    BaO—0.6 weight %
    $Na_2O$—11.1 weight %
    $K_2O$—5.0 weight %
    $Sb_2O_3$—0.5 weight %

6. The phototropic glass sheet of claim 1 wherein each said layer has the following composition on a 100 weight percent total basis:
    $SiO_2$—69.6 weight %
    $Al_2O_3$—— weight %
    CaO—6.6 weight %
    BaO—2.1 weight %
    $TiO_2$—0.4 weight %
    $Na_2O$—8.1 weight %
    $K_2O$—8.5 weight %
    $Sb_2O_3$—0.7 weight %

7. The phototropic glass sheet of claim 1 wherein each said layer has the following composition on a 100 weight percent total basis:
    $SiO_2$—70.6 weight %
    $Al_2O_3$—1.4 weight %
    CaO—6.8 weight %
    BaO—— weight %
    $TiO_2$—— weight %
    $Na_2O$—15.4 weight %
    $K_2O$—0.8 weight %
    $Sb_2O_3$—— weight %
    MgO—4.7 weight %
    $Sb_2O_3$—0.25 weight %

8. The phototropic glass sheet of claim 1 wherein each said other layer has the following composition on a 100 weight percent total basis:
    $SiO_2$—38.5 weight %
    $B_2O_3$—16.6 weight %
    $Al_2O_3$—4.9 weight %
    $ZrO_2$—1.0 weight %
    PbO—23.3 weight %
    $Li_2O$—2.0 weight %
    $Na_2O$—5.6 weight %
    $K_2O$—8.1 weight %
    with an additional additive content of 0.4 weight % $Ag_2O$, 1.5 weight % Cl and 1.4 weight % Br.

9. The phototropic glass sheet of claim 1 wherein each said other layer has the following composition on a 100 weight percent total basis:
    $SiO_2$—45.5 weight %
    $B_2O_3$—11.7 weight %
    $Al_2O$—5.1 weight %
    $ZrO_2$—1.0 weight %
    PbO—20.6 weight %
    $Li_2O$—2.1 weight %
    $Na_2O$—4.8 weight %
    $K_2O$—8.3 weight %
    with an additional additive content of 0.34 weight % $Ag_2O$, 1.0 weight % Cl and 1.2 weight % Br.

10. The phototropic glass sheet of claim 1 wherein each said other layer has the following composition on a 100 weight percent total basis:
    $SiO_2$—40.0 weight %
    $B_2O_3$—16.6 weight %
    $Zr_2O$—5.0 weight %
    PbO—21.7 weight %
    $Li_2O$—2.0 weight %
    $Na_2O$—5.6 weight %
    $K_2I$—8.1 weight %
    with additional additive content of 0.2 $Ag_2O$, 0.8 weight % Cl and 0.7 weight % Br.

* * * * *